United States Patent Office 3,372,907
Patented Mar. 12, 1968

3,372,907
APPARATUS FOR PRODUCING A RELATIVE LINEAR DISPLACEMENT BETWEEN A COLUMN AND A MOVABLE BODY
August Hendrik Maria Smulders, Wassenaar, Jakob Jan Bieze, Schiedam, Johannes Frans Hage, Zwijndrecht, and Simon Splinter, Schiedam, Netherlands, assignors to N.V. Werf Gusto v/h Firma A. F. Smulders, Schiedam, South Holland, Netherlands
Filed July 19, 1966, Ser. No. 566,362
Claims priority, application Netherlands, July 26, 1965, 65—9,650
7 Claims. (Cl. 254—110)

ABSTRACT OF THE DISCLOSURE

Apparatus for producing a relative linear displacement between a vertical column and a movable body is characterized in that the column is square and has regularly spaced outwardly extending teeth disposed along each vertical corner of the column. Driving and blocking pawls in the form of horizontal bars selectively engage with and drive the column and the movable body relative to each other under the influence of a pair of fluid motors of the cylinder-and-piston type that are connected to the ends of each bar on opposite sides of each corner of the column.

---

The present invention relates to apparatus for producing a relative linear displacement between a column and a movable body, more particularly of the type in which regularly spaced teeth are disposed in series along the length of a column, and driving and blocking pawl means are alternately engageable with the teeth to move the column vertically relative to the body.

The present invention is an improvement on the apparatus of Patent No. 3,056,585, Oct. 2, 1962. In the apparatus of that patent, the column is rectangular and the teeth are in alignment with and lie in the planes of two opposite side walls. The pawl members must thus span the width of the column in order to extend between and engage with the teeth of a pair of series on each side of the column. If the column is large, then the pawls must be correspondingly long and are difficult to operate.

Also in the apparatus of the patent, the drive means for the driving pawl members are disposed in vertical alignment with the drive means for the blocking pawl members. All these drive means are carried by a support which in turn is mounted on the body relative to which the column is vertically movable. As a result, this support must have great height, and this in turn affects the length of the column that can be handled by such apparatus.

Accordingly, it is an object of the present invention to provide such apparatus, in which the height of the supporting structure for the column is desirably low.

Another object of the present invention is the provision of such apparatus, in which the length of the driving and blocking pawls is desirably short.

Finally, it is an object of the present invention to provide such apparatus that will be relatively simple and inexpensive to manufacture, easy to assemble, operate, maintain and repair, and rugged and durable in use.

Other objects and advantages of the present invention will become apparent from a consideration of the following description, taken in connection with the accompanying drawings, in which.

Figure 1:
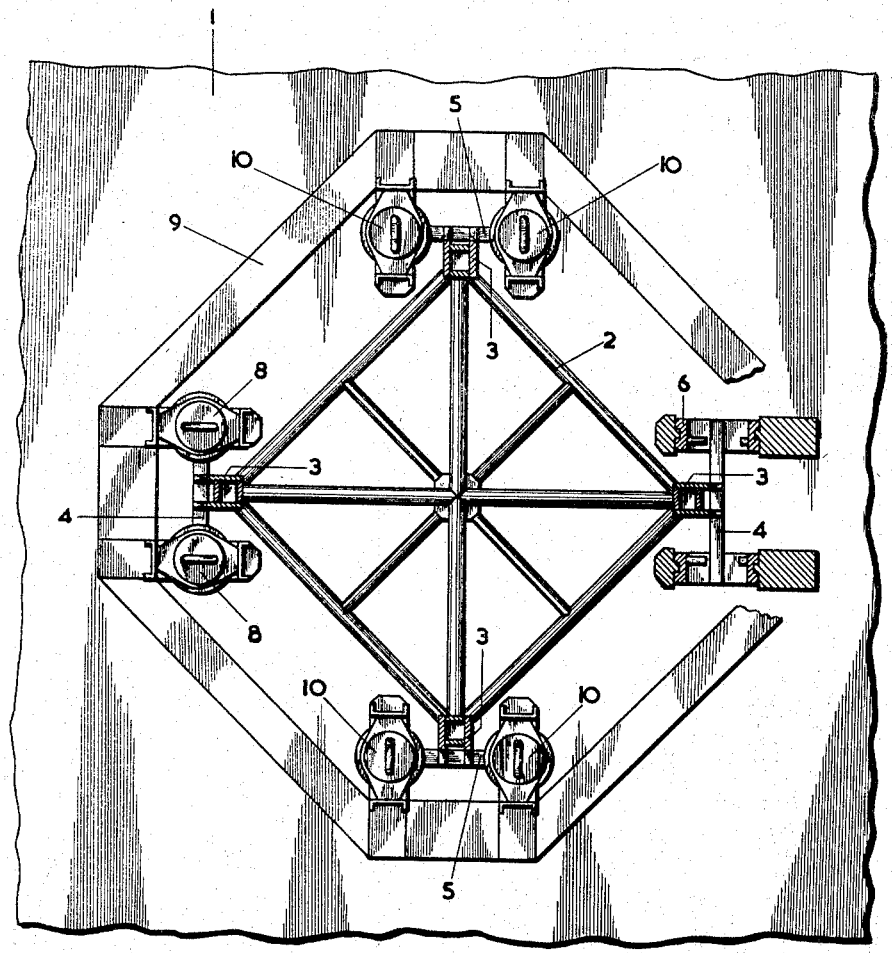
FIGURE 1 is a top plan view of apparatus according to the invention, with parts broken away for clarity of illustration.
Figure 2:
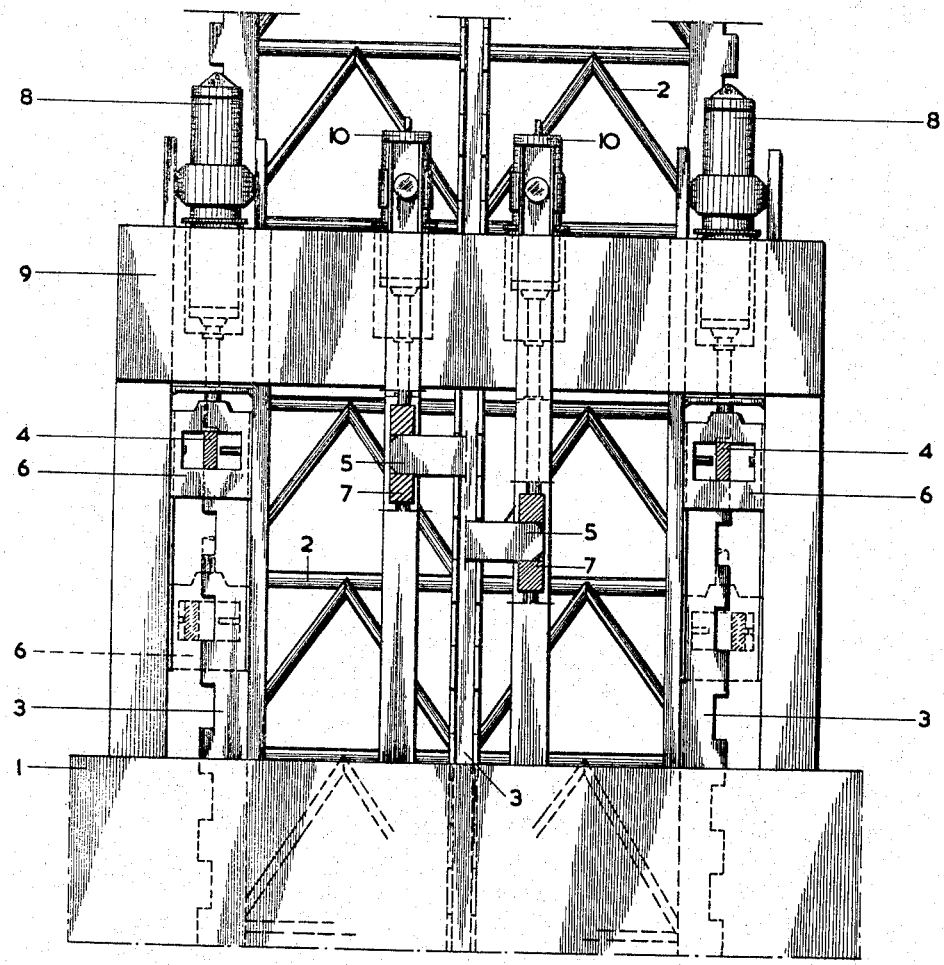
FIGURE 2 is a side elevational view of apparatus according to the invention, with parts broken away for clarity of illustration.

Referring now to the drawings in greater detail, there is shown a body which in the illustrated embodiment is in the form of a pontoon 1. An upright column 2 of considerable length extends through pontoon 1 in a conventional way (not shown) which may be the same as in the above-identified patent. Column 2 is of large dimensions and is accordingly in the form of an open framework and is polygonal and preferably has an even number of sides. More preferably, it is rectangular, and most preferably square in cross section, as in the illustrated embodiment.

At each of its corners, column 2 is provided with a double series of teeth 3. Teeth 3 extend outwardly away from the column at oblique angles to both adjacent sides, which in the illustrated embodiment is at 135° to each adjacent side. Each series of teeth 3 extends along the length of column 2 parallel to the axis of the column.

Driving pawl members 4 and blocking pawl members 5 are provided, in the form of horizontal bars. At their ends, the pawl members 4 are held in crossheads 6. The pawl members 5 are held at their ends in crossheads 7. There is a fluid motor 8 of the cylinder and piston type disposed above each crosshead 6 with its piston extending downwardly and secured to crosshead 6. The motors 8 are carried by a support structure 9 which in turn is carried by body 1 and extends above body 1 and surrounds column 2. There is another motor 10 of the cylinder and piston type similarly arranged with regard to each crosshead 7 to actuate the blocking pawls 5. As in the case of crossheads 6, crossheads 7 are also guided on support 9 for vertical sliding movement.

The arrangement of the motors 8 and 10 is particularly to be noted. Specifically, the motors for the driving pawls are at the same level as the motors for the blocking pawls. This contrasts with the construction of the above-identified patent, in which the motors were one above the other and the support for the motors accordingly had to be undesirably high.

It is also to be noted that the blocking and driving pawls each have a pair of fluid motors disposed in association therewith, the motors of the pair being disposed on opposite sides of the associated series of teeth 3. The teeth 3 being disposed in the corners and arranged as described above, the motors 8 or 10 on opposite ends of a pawl 4 or 5 can accordingly be spaced quite close to each other regardless of the size of the column 2, with the result that the pawls 4 and 5 can be desirably short.

As also in the case of the apparatus of the above-identified patent, it will be noted that the pawls 4 and 5 are movable horizontally into and out of engagement with the teeth 3 by means (not shown) which may be the same as in the patent. It is also to be understood that the blocking pawls 5 are vertically reciprocable over a distance at least equal to the pitch of the teeth 3, while the driving pawls 4 are vertically reciprocable over a distance equal to at least twice the pitch of the teeth 3, for the reasons and the purposes set forth in the above-identified patent.

It is also particularly to be noted that the teeth with which the blocking pawls engage are not engaged by the driving pawls, and the teeth with which the driving pawls engage are not engaged by the blocking pawls.

Figure 3:
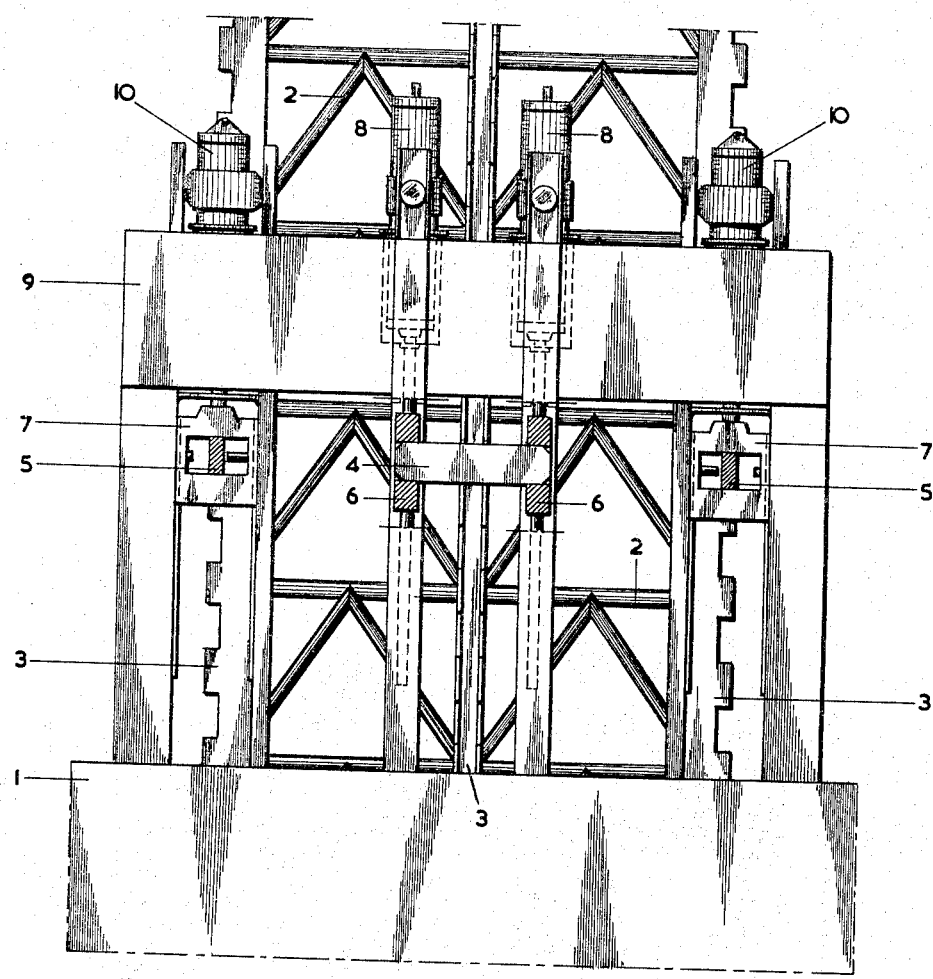
FIGURE 3 is a view similar to FIG. 2 but showing a side perpendicular to the side shown in FIG. 2.

In operation, the driving pawls 4 and motors 8 associated therewith are simultaneously actuated on opposite sides of the machine, with the pawls engaged in the recesses between teeth 3, to raise or lower column 2 by a predetermined distance which is preferably an even multiple of the pitch of teeth 3. The column 2 is thus correspondingly raised or lowered. At the end of the stroke of the pistons of motors 8, the blocking pawls 5 are moved from outer positions within crossheads 7 to inner positions as shown in FIG. 3, in which latter positions they prevent vertical movement of the column. If pawls 5 are not precisely in register with any gap between teeth 3, then motors 10 are actuated to raise or lower the pawls 5 a corresponding amount. The pawls 5 are then moved inwardly by the aforementioned mechanism (not shown). Thereafter, the driving pawls 4 can be disengaged from their teeth and returned to their starting position for imparting another increment of movement to the column.

Except as described or implied above, the structure and operation of the present invention can be the same as in the above-identified patent.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be effected without departing from the invention, as those skilled in this art will readily understand. Such modifications and variations are considered to be within the purview and scope of the present invention as defined by the appended claims.

Having described our invention, we claim:

1. Apparatus comprising a body, a support structure mounted on the body and extending upwardly therefrom, a column movably supported by said support structure for vertical movement relative to said body, said column being rectangular in cross section and having four vertically disposed corners, a series of regularly spaced teeth mounted along each corner of the column, a separate pawl for engaging the teeth along each corner of the column, the two said pawls that engage the teeth along two diagonally opposite corners of the column being horizontally movable, and two pairs of motors for vertically moving the other two said pawls that engage the teeth along the other two diagonally opposite corners of the column, the said motors of each pair being disposed on opposite sides of their associated said corner of the column.

2. Apparatus as claimed in claim 1, said motors being fluid motors of the cylinder-and-piston type whose axes are vertically disposed.

3. Apparatus as claimed in claim 2, the pawls moved by said fluid motors comprising each a bar connected at its opposite ends to the pistons of its associated fluid motors and engaging its associated said teeth intermediate its ends.

4. Apparatus as claimed in claim 1, said column being square in cross section.

5. Apparatus as claimed in claim 1, and two more pairs of motors for vertically moving said horizontally movable pawls, the motors of each pair of said two more pairs of motors being disposed on opposite sides of their associated said corner of the column.

6. Apparatus as claimed in claim 5, all four pairs of motors being disposed at about the same level as each other.

7. Apparatus as claimed in claim 1, said teeth extending outwardly from the column at oblique angles to the adjacent sides of the column.

References Cited

UNITED STATES PATENTS

| | | | |
|---|---|---|---|
| 2,947,148 | 8/1960 | Young | 254—110 |
| 2,963,868 | 12/1960 | Armstrong | 254—105 |
| 3,056,585 | 10/1962 | Smulders | 254—110 |
| 3,096,076 | 7/1963 | Walli | 254—109 |
| 3,259,368 | 7/1966 | Warnke | 254—110 |

FOREIGN PATENTS

| | | |
|---|---|---|
| 934,369 | 8/1963 | Great Britain. |

OTHELL M. SIMPSON, *Primary Examiner.*